United States Patent
Gururaj et al.

(10) Patent No.: US 10,374,653 B2
(45) Date of Patent: Aug. 6, 2019

(54) V2X ANTENNA SYSTEMS

(71) Applicant: Laird Technologies, Inc., Earth City, MO (US)

(72) Inventors: Panamalai G. Gururaj, Holly, MI (US); Cheikh T. Thiam, Grand Blanc, MI (US)

(*) Notice: Subject to any disclaimer, the term of this patent is extended or adjusted under 35 U.S.C. 154(b) by 79 days.

(21) Appl. No.: 15/048,617

(22) Filed: Feb. 19, 2016

(65) Prior Publication Data

US 2017/0047962 A1 Feb. 16, 2017

Related U.S. Application Data

(60) Provisional application No. 62/204,616, filed on Aug. 13, 2015.

(51) Int. Cl.
*H04B 1/44* (2006.01)
*H01Q 1/32* (2006.01)

(52) U.S. Cl.
CPC ............... *H04B 1/44* (2013.01); *H01Q 1/325* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 7,252,513 B1 | 8/2007 | Hildebrand et al. | |
| 7,710,333 B2 | 5/2010 | Byrne et al. | |
| 7,909,612 B2 | 3/2011 | Steinkamp et al. | |
| 8,436,775 B2 | 5/2013 | Brey et al. | |
| 8,462,056 B2 | 6/2013 | Byun et al. | |
| 8,514,144 B2 | 8/2013 | Gray et al. | |
| 9,070,070 B2 | 6/2015 | Nguyen | |
| 2006/0058072 A1* | 3/2006 | Buren ................. | H04B 1/3877 455/572 |
| 2009/0228172 A1* | 9/2009 | Markyvech ........... | G01S 5/0072 701/36 |
| 2010/0167639 A1* | 7/2010 | Ranson .............. | H04B 7/15571 455/24 |
| 2012/0117094 A1* | 5/2012 | Pratt ...................... | G06Q 10/06 707/758 |
| 2012/0289171 A1* | 11/2012 | Vogas ..................... | H04B 1/40 455/77 |

(Continued)

FOREIGN PATENT DOCUMENTS

EP 2064775 A2 6/2009

OTHER PUBLICATIONS

U.S. Appl. No. 62/204,616, filed Aug. 13, 2015, Panamalai G. Gururaj et al.

*Primary Examiner* — Alejandro Rivero
(74) *Attorney, Agent, or Firm* — Harness, Dickey & Pierce, P.L.C.; Anthony G. Fussner (57) ABSTRACT

Disclosed are exemplary embodiments of V2X antenna systems. In an exemplary embodiment, a V2X antenna system comprises a coupler and a microcontroller. The coupler is operable for sensing radio frequency (RF) power and relaying the information to the microcontroller. The microcontroller is operable for controlling RF switches to selectively activate either a transmit path (Tx-path) or a receive path (Rx-path) based on the information from the coupler. The microcontroller may also be operable for controlling one or more attenuators to control attenuation of signals.

20 Claims, 3 Drawing Sheets

(56) References Cited

U.S. PATENT DOCUMENTS

| | | | | |
|---|---|---|---|---|
| 2015/0237628 A1* | 8/2015 | Nerella | ............... | H04W 52/52 370/329 |
| 2015/0318605 A1* | 11/2015 | Talty | ............... | H01Q 9/32 343/715 |
| 2015/0372656 A1* | 12/2015 | Mow | ............... | H03H 7/38 455/77 |

* cited by examiner

FIG. 3

V2X ANTENNA SYSTEMS

CROSS-REFERENCE TO RELATED APPLICATION

This patent application claims the benefit of and priority to U.S. Provisional Patent Application No. 62/204,616 filed Aug. 13, 2015. The entire disclosure of the above application is incorporated herein by reference.

FIELD

The present disclosure generally relates to V2X antenna systems.

BACKGROUND

This section provides background information related to the present disclosure which is not necessarily prior art.

Various different types of antennas are used in the automotive industry, including amplitude modulation (AM) and/or frequency modulation (FM) radio antennas, satellite digital audio radio service (SDARS) antennas, global navigation satellite system (GNSS) antennas (e.g., global positioning system (GPS) antennas, etc.), cellular antennas, etc. Automotive antennas may be installed or mounted on an exterior vehicle surface, such as the roof, trunk, or hood of the vehicle to help ensure that the antennas have unobstructed views overhead or toward the zenith. The antennas may be connected (e.g., using one or more RF coaxial cables, etc.) to one or more electronic devices (e.g., a radio receiver, a touchscreen display, a navigation device, a cellular phone, etc.) inside the passenger compartment of the vehicle, such that the antennas are operable for transmitting and/or receiving signals to/from the electronic device(s) inside the vehicle.

It can be challenging to have good signal quality and higher performance with the conductive loss (e.g., RF coaxial cable loss, etc.) between the electronic devices, especially at higher frequency bands (e.g. 5.9 gigahertz (GHz)), and/or signal compression, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Disclosed herein are exemplary embodiments of V2X smart antenna systems or assemblies that include feedback systems, which may sense and control radio frequency (RF) paths and attenuation of transmitted signals to help ensure signal integrity. In an exemplary embodiment, the feedback system may comprise a coupler and a microcontroller. The coupler is operable for sensing radio frequency (RF) power and relaying the information to the microcontroller. The microcontroller is operable for controlling RF switches to selectively activate either a transmit path (Tx-path) or a receive path (Rx-path) based on the information from the coupler. The microcontroller may also be operable for controlling one or more attenuators to control attenuation of signals. The V2X antenna system may include a front end module (FEM) and adaptive control using a feedback system or network.

The V2X antenna system may be used with in-vehicle connectivity systems that house the DSRC functionality. The V2X antenna system may be operable or work with any DSRC system as the V2X antenna system is adaptive in nature, e.g., attenuation is adaptively modified based on whether there are cables or not, etc.

By way of background, vehicle to vehicle communication or vehicle to infrastructure communication is commonly symbolized as V2X. A V2X system communicates with other V2X systems using DSRC (Dedicated Short Range Communications) that operates at 5.9 GHz frequency. DSRC is based on the 802.11p and WAVE (US standard) or ETSI (EU standard). As disclosed herein, exemplary embodiments include a V2X adaptive antenna system configured to provide a wireless path to communicate between V2X devices at 5.9 GHz. The V2X adaptive antenna system may comprise an antenna integrated with a front end module and adaptive control using a feedback network. The framework is antenna to coaxial cable to a radio.

The inventors hereof have recognized problems that may be addressed and/or solved by exemplary embodiments disclosed herein, such as losses in the RF cable from the V2X radio system to the adaptive antenna module (AAM); power of the signal transmitted by the V2X radio may be too high for the power amplifier (PA) leading to compression of the signal resulting in degradation of the quality of the signal and higher packet error ratio (PER); lack of intelligent switching between transmit path (Tx-path) and receive path (Rx-path); lack of prior information regarding the V2X system installed inside the vehicle as different OEMs use different chip solutions; and/or additional cost of digital cabling for antenna to communicate with the V2X system inside the vehicle.

In exemplary embodiments, a smart antenna may sense RF power using a coupler, which may then relay the information to a microcontroller. Based on this information, the microcontroller may then control RF switches to activate either the transmit path or receive path. The microcontroller may also control a variable attenuator to control the attenuation of the signal to help ensure the Power Amplifier (PA) at the end of the RF path does not compress in the input signal. This, in turn, may help ensure the signal being transmitted out of the antenna is not corrupted. The coupler may be a simple PCB trace RF coupler, a chip based directional coupler or bi-directional coupler. The coupler may have an integrated RF indicator or an external RF detector. The attenuator may be a variable attenuator, a step attenuator, or a fixed attenuator. The attenuator may be controlled by voltage, current, or digital signals.

An example embodiment of a V2X smart antenna system may include a front end module (FEM) and adaptive control (e.g., circuitry, etc.) using a feedback network or system. The V2X smart antenna system may be configured to enable communication between V2X devices via a wireless path on the 802.11p protocol at 5.9 gigahertz (GHz). In this example, the front end module is designed to utilize a feedback system to reduce loss in the RF cables, improve transmitted/received signal quality, and increase Tx and Rx path switching intelligence.

Also in this example, the V2X antenna system may help solve the problem due to the lack of prior information/knowledge regarding the existing V2X antenna system installed inside the vehicle as different original equipment manufacturers (OEMs) use different chip solutions. Further, this example V2X antenna system does not require any digital communication from the V2X devices inside the vehicle, thus no additional digital cables are needed. It can be appreciated that using such a feedback control circuitry is more cost effective than using digital cabling for antenna communication with the V2X systems. The circuitry of the V2X antenna system may be entirely integrated inside a single antenna system and require only DC power and RF signal at the RF feed. Accordingly, the V2X antenna system may thus be a roof-mount antenna system that is configured to house all circuitry necessary to achieve the following functions: adaptive compensation for cable loss using a low noise amplifier (LNA) and a power amplifier (PA), adaptive control of input power levels to avoid, minimize, or at least reduce compression of the PA, active switching between the Tx-path and Rx-path based on feedback, feedback control in the adaptive antenna module (AAM) for both Tx and Rx, such that it is independent of the vehicle system, and managing RF cable and compensation without any prior knowledge of the V2X system.

Figure 1:
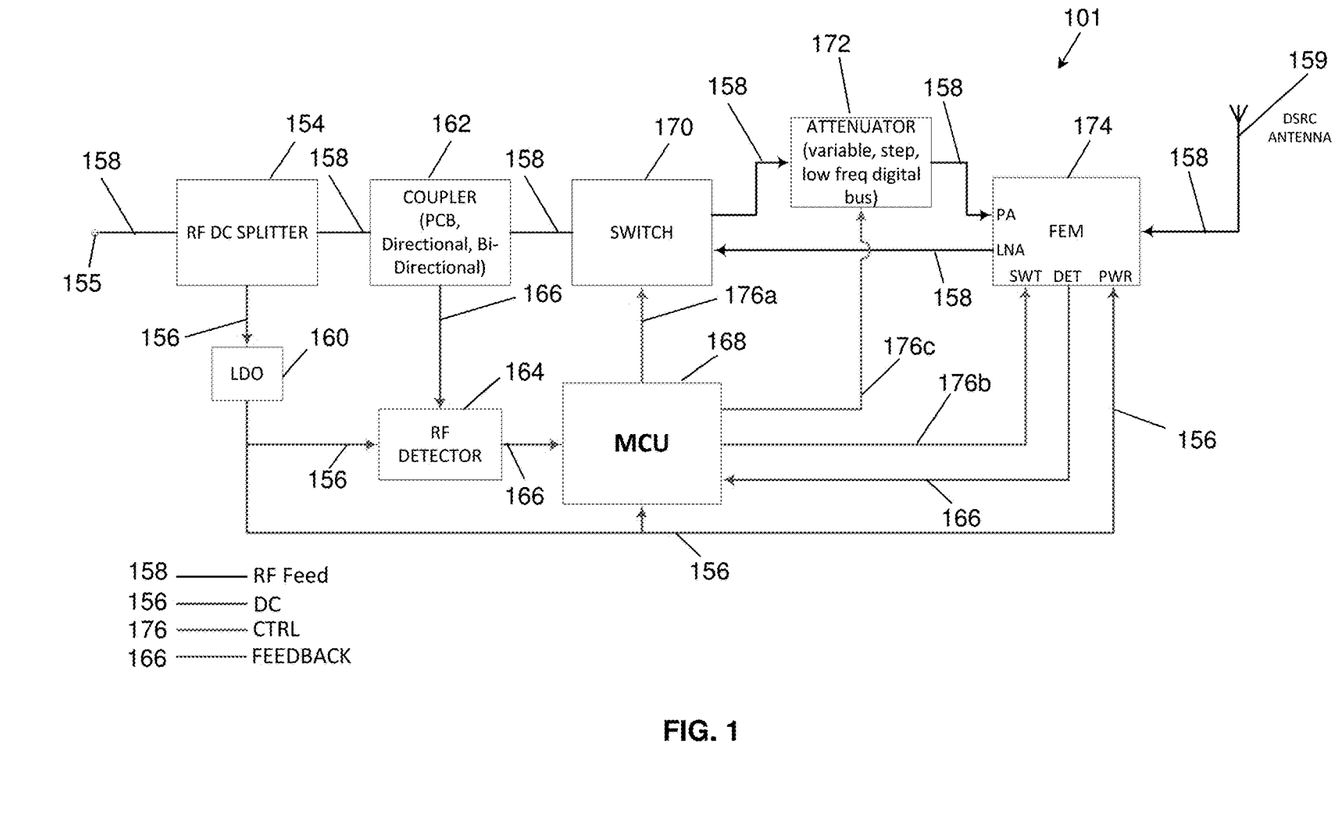
FIG. 1 is a block diagram showing components of a V2X antenna system including a microcontroller and a front end module (FEM), where the front end module includes an integrated power amplifier (PA) and low noise amplifier (LNA) according to an exemplary embodiment.

With reference now to the figures, FIG. 1 shows components of a V2X antenna system 101 according to an exemplary embodiment that integrates a feedback system using a microcontroller (MCU) 168. As shown in FIG. 1, the front end module (FEM) 174 includes an integrated power amplifier (PA) and low noise amplifier (LNA).

FIG. 1 also shows circuitry including RF feed lines 158, DC power lines 156, control lines 176, and feedback lines 166. In exemplary embodiments, an RF DC splitter 154 splits the input signal from RF feed point 155 into a DC power supply 156 and RF signal feed 158, that respectively relays to a low-dropout (LDO) voltage regulator 160 and a coupler 162. The split DC power supply 156 supplies DC power to an RF detector 164, a microprocessor unit (MCU) 168, and a front end module 174 at PWR.

The coupler 162, for example, may be a simple PCB trace RF coupler, a chip based directional coupler, or a bi-directional coupler, etc. The coupler 162 may include an integrated RF indicator, or an external RF detector may be used. This illustrated example includes an RF detector 164 configured for receiving a feedback signal from the coupler 162. The feedback signal detected by the RF detector 164 is then provided to the MCU 168.

In the exemplary embodiments, the system components 101 including the microcontroller (MCU) 168, the low-dropout (LDO) voltage regulator 160, the coupler 162, the RF detector 164, the switch 170, the attenuator 172, the front end module (FEM) 174, and the RF DC splitter 154 may be entirely integrated or included in a single smart antenna system or assembly. Thus, this exemplary antenna system only requires DC power and RF signal at the RF feed point 155. A DSRC antenna 159 may also be integrated or included in that same antenna system. Alternatively, DC power supply(ies) may be provided with or through direct SMT RF connectors and not through a cable harness in other exemplary embodiments of antenna systems.

During operation, the smart antenna assembly or system senses the RF power via the RF signal feed 158 using the coupler 162. The coupler 162 relays the information to the MCU 168 (e.g., solid flash SLE 97 smartcard microcontroller, etc.) via the RF detector 164. The MCU 168 is operable for controlling RF switch 170 and RF switch (SWT) of the FEM 174 to selectively activate either a transmit path (Tx-path) or a receive path (Rx-path) based at least in part on the information relayed from the coupler 162. The MCU 168 may use the detected feedback signal received and detected by the RF detector 164 and the detected feedback signal received by the FEM 174 (DET) from the DSRC antenna 159 to control the RF switch 170 and RF switch (SWT) of the FEM 174. For example, the MCU 168 may send a control signal via line 176a to the RF switch 170 or via control line 176b to the FEM 174 to activate either the Rx-path or the Tx-path based on the detected signals. The detected information may also be used by the MCU 168 to control the attenuator 172 via the control line 176c, thereby controlling the signal attenuation to ensure that the RF feed signal is not compressed before the RF feed signal relays to the input PA of the FEM 174, which is at the end of the Tx-path. This ensures the signal being transmitted through the antenna is not corrupted.

The attenuator 172 may be a variable attenuator, a step attenuator or a fixed attenuator, etc. The attenuator 172 may be controlled by voltage, current, digital signals, etc.

Figure 2:
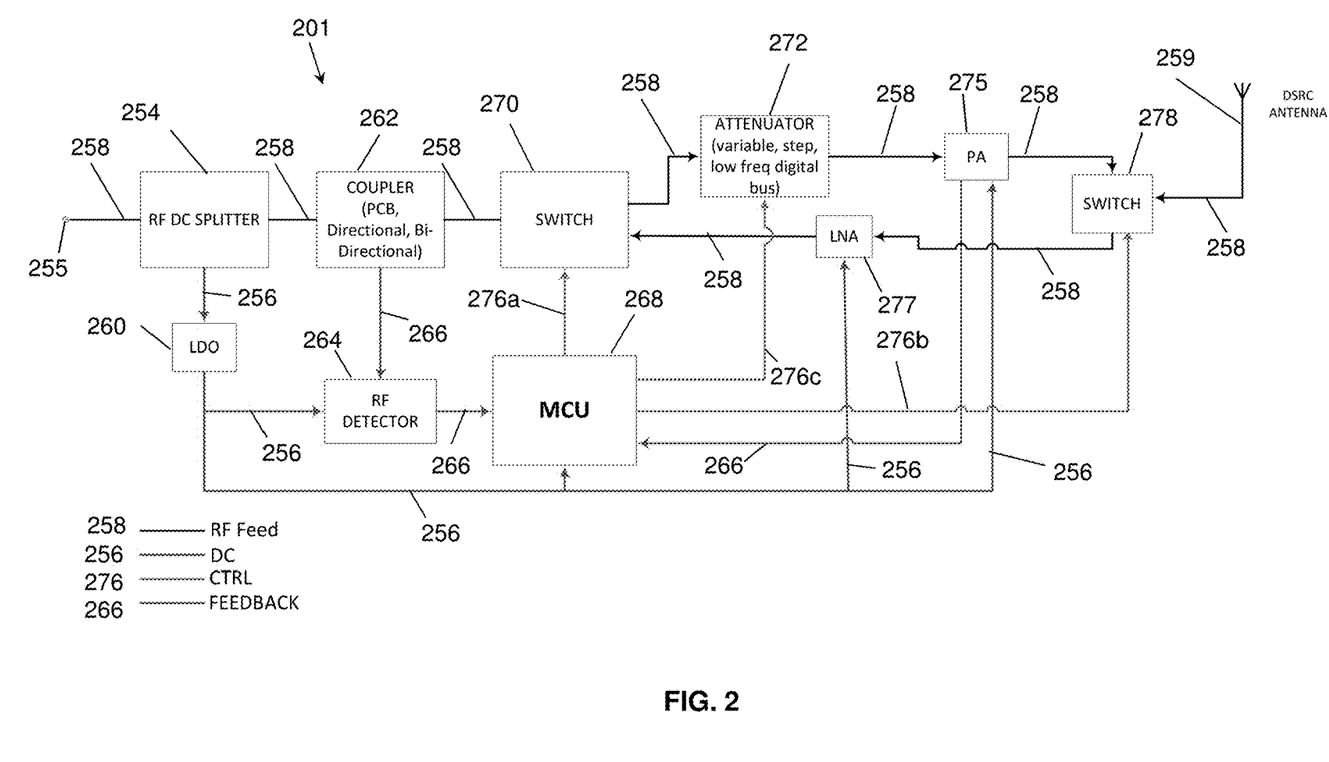
FIG. 2 is a block diagram showing components of a V2X antenna system including a microcontroller, a power amplifier (PA), a low noise amplifier (LNA), where the power amplifier and low noise amplifier are separate (not integrated) components according to another exemplary embodiment.

FIG. 2 is an exemplary block diagram showing components of a V2X antenna system 201 according to an exemplary embodiment that integrates a feedback system using a microcontroller (MCU) 268. In the example shown in FIG. 2, the power amplifier (PA) 275 and the low noise amplifier (LNA) 277 are separate (not integrated) components.

FIG. 2 also shows circuitry including RF feed lines 258, DC power lines 256, control lines 276, and feedback lines 266. In this example, the PA 275 and LNA 277 are not integrated within a single FEM, but are two separate modules separated by a switch 278. The MCU 268 may control the switch 270 via control line 276a based on detected RF signals. The MCU 278 may control the other switch 278 via control line 276b based on amplified received signals. Both switches 270 and 278 can be controlled by the MCU 268 to selectively activate either the Rx-path or the Tx-path. The MCU 268 may also control the attenuator 272 via the control line 276c based on the detected RF signal. The switches 272 and 278 may be left in receive mode by default because sensing the received power at the coupler 262 may not be possible. The switches 272 and 278 may remain in receive mode all the time except when an output signal is sensed. When an output signal is sensed, the switches 272 and 278 may then be switched to transmit mode by using the control lines 276a and 276b. The attentuation of the attenuator 272 may also be changed to prevent compression.

Also shown in FIG. 2 are an RF DC splitter 254, a low-dropout (LDO) voltage regulator 260, and a coupler 262. The RF DC splitter 254 may split the input signal from RF feed point 255 into a DC power supply 256 and RF signal feed 258, that respectively relays to the low-dropout (LDO) voltage regulator 260 and the coupler 262. The split DC power supply 256 supplies DC power to the RF detector 264, the microprocessor unit (MCU) 268, the LNA 277, and the PA 275.

The coupler 262, for example, may be a simple PCB trace RF coupler, a chip based directional coupler, or a bi-directional coupler, etc. The coupler 262 may include an integrated RF indicator, or an external RF detector may be used. This illustrated example includes an RF detector 264 configured for receiving a feedback signal from the coupler 262. The feedback signal detected by the RF detector 264 is then provided to the MCU 268.

In the exemplary embodiments, the system components 201 including the microcontroller (MCU) 268, the low-dropout (LDO) voltage regulator 260, the coupler 262, the RF detector 264, the switches 270 and 278, the attenuator 272, the low noise amplifier (LNA) 277, the power amplifier (PA) 275, and the RF DC splitter 254 may be entirely integrated or included in a single smart antenna system or assembly. Thus, the antenna system only requires DC power and RF signal at the RF feed point 255. A DSRC antenna 259 may also be integrated or included in that same antenna system.

During operation, the smart antenna assembly or system senses the RF power using the coupler 262. The coupler 262 relays the information to the MCU 268 (e.g., solid flash SLE 97 smartcard microcontroller, etc.) via the RF detector 264. The MCU 268 is operable for controlling RF switches 270 and 278 to selectively activate either a transmit path (Tx-path) or a receive path (Rx-path) based at least in part on the information relayed from the coupler 262.

The MCU 268 may also control the attenuator 272 to thereby control attenuation of the signal, e.g., to adaptively control input power levels to avoid, minimize, or at least reduce compression of the PA 275, etc. The attenuator 272 may be a variable attenuator, a step attenuator, or a fixed attenuator, etc. The attenuator 272 may be controlled by voltage, current, digital signals, etc.

Figure 3:
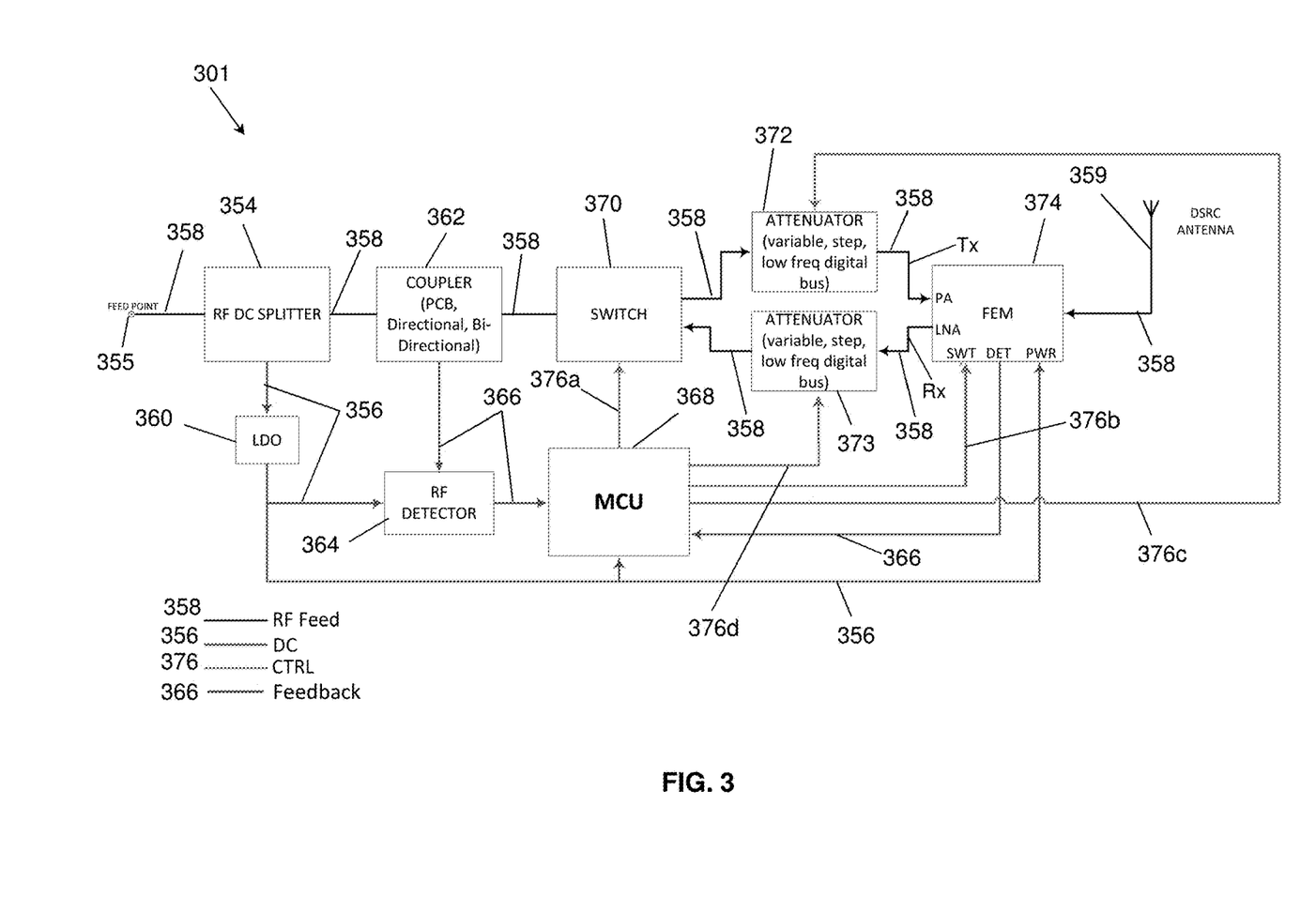
FIG. 3 is a block diagram showing components of a V2X antenna system including attenuators on both of the transmit (Tx) and receive (Rx) paths and an integrated front end module (FEM), where the front end module includes an integrated power amplifier (PA) and low noise amplifier (LNA) according to a further exemplary embodiment.

FIG. 3 is an exemplary block diagram showing components of a V2X antenna system 301 according to an exemplary embodiment that integrates a feedback system using a microcontroller (MCU) 368. As shown in FIG. 3, the front end module (FEM) 374 includes an integrated power amplifier (PA) and low noise amplifier (LNA). In addition, first and second attenuators 372, 373 are on the transmit (Tx) path and receive (Rx) path, respectively.

FIG. 3 also shows circuitry including RF feed lines 358, DC power lines 356, control lines 376, and feedback lines 366. In this example, the MCU 368 may control a switch 370 via control line 376a and a switch (SWT) of a FEM 374 via control line 376b to activate the Rx-path or Tx-path. The MCU 368 may also control the attenuator 372 on the Tx-path via control line 376c and the attenuator 373 on the Rx-path via control line 376d based on the detected signals. For example, the MCU 368 may determine the attenuation on the Tx-path based on the detected RF signals coming from the feed point 355, and the MCU 368 may determine the attenuation on the Rx-path based on the detected signals received from the antenna system (e.g., DET on the FEM 374, etc.). The MCU 368 controls the switch 370 and the switch (SWT) of the FEM 374 to activate the Tx-path or Rx-path according to this detected information.

Also shown in FIG. 3 are an RF DC splitter 354, a low-dropout (LDO) voltage regulator 360, and a coupler 362. The RF DC splitter 354 may split the input signal from RF feed point 355 into a DC power supply 356 and RF signal feed 358, that respectively relays to the low-dropout (LDO) voltage regulator 360 and the coupler 362. The split DC power supply 356 supplies DC power to the RF detector 364, the microprocessor unit (MCU) 368, and the front end module 374 at PWR.

The coupler 362, for example, may be a simple PCB trace RF coupler, a chip based directional coupler, or a bi-directional coupler, etc. The coupler 362 may include an integrated RF indicator, or an external RF detector may be used. This illustrated example includes an RF detector 364 configured for receiving a feedback signal from the coupler 362. The feedback signal detected by the RF detector 364 is then provided to the MCU 368.

In the exemplary embodiments, the system components 301 including the microcontroller (MCU) 368, the low-dropout (LDO) voltage regulator 360, the coupler 362, the RF detector 364, the switch 370, the FEM 374, and the RF DC splitter 354 may be entirely integrated or included in a single smart antenna system or assembly. Thus, the antenna system only requires DC power and RF signal at the RF feed point 355. A DSRC antenna 359 may also be integrated or included in the same antenna system.

During operation, the smart antenna assembly or system senses the RF power using the coupler 362. The coupler 362 relays the information to the MCU 368 (e.g., solid flash SLE 97 smartcard microcontroller, etc.) via the RF detector 364. The MCU 368 is operable for controlling RF switch 370 and switch (SWT) of the FEM 374 to selectively activate either a transmit path (Tx-path) or a receive path (Rx-path) based at least in part on the information relayed from the coupler 362. The MCU 368 may also control the attenuators 372, 373 to thereby control attenuation of the signals. The attenuators 372, 373 may be variable attenuators, step attenuators or fixed attenuators, etc. The attenuators 372, 373 may be controlled by voltage, current, digital signals, etc.

Antenna systems disclosed herein may be mounted to a wide range of supporting structures, including stationary platforms and mobile platforms. For example, an antenna assembly or system disclosed herein could be mounted to a supporting structure of a bus, train, aircraft, bicycle, motorcycle, boat, among other mobile platforms. Accordingly, the specific references to motor vehicles or automobiles or vehicles herein should not be construed as limiting the scope of the present disclosure to any specific type of supporting structure or environment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A V2X antenna system for a vehicular antenna configured for installation to a body wall of a vehicle, the V2X antenna system comprising:
   a coupler, a microcontroller, at least one attenuator including a first variable attenuator along a transmit path (Tx-path), and a power amplifier (PA),
   wherein the coupler is operable for sensing radio frequency (RF) power of RF signals received from a transmitting device remote from the V2X antenna system via an RF feed line and relaying information to the microcontroller,
   wherein the first variable attenuator is operable for attenuating the RF signals when the RF signals are communicated along the Tx-path,
   wherein the PA is configured to amplify the RF signals attenuated by the first variable attenuator for re-transmission via the vehicular antenna, thereby enabling the V2X antenna system to compensate for a loss of power of the RF signals received from the transmitting device via the RF feed line,
   wherein the first variable attenuator is configured to attenuate the RF signals before amplification by the PA, and
   wherein the microcontroller is operable for:
      controlling RF switches to selectively activate either the Tx-path or a receive path (Rx-path) based at least in part on the information relayed from the coupler, wherein the V2X antenna system is configured to provide a wireless path for communication between V2X devices, wherein the microcontroller is configured to control the RF switches to selectively activate the Tx-path when the information relayed to the microcontroller indicates transmitting signals and to selectively activate the Rx-path when the information relayed to the microcontroller indicates received signals and controlling at least the first variable attenuator along the Tx-path to control power of the RF signals received from the transmitting device via the RF feed line to a level such that compression of the RF signals when amplified by the PA is reduced or minimized, thereby enabling the V2X antenna system to re-transmit the RF signals received from the transmitting device via the RF feed line through the vehicular antenna without corruption.

2. The V2X antenna system of claim 1, wherein the at least one attenuator includes a second attenuator along the Rx-path and operable for attenuating signals communicated along the Rx-path.

3. The V2X antenna system of claim 1, further comprising a low noise amplifier (LNA), and wherein the at least one attenuator includes a second attenuator configured to attenuate signals after amplification by the LNA.

4. The V2X antenna system of claim 1, wherein:
the at least one attenuator is controllable by digital signals; and
the coupler comprises a bi-directional coupler.

5. The V2X antenna system of claim 1, further comprising a low noise amplifier (LNA) configured for amplifying received signals.

6. The V2X antenna system of claim 5, wherein the PA and the LNA are integrated in a single front end module (FEM).

7. The V2X antenna system of claim 6, wherein the single FEM further comprises at least one of the RF switches controllable by the microcontroller.

8. The V2X antenna system of claim 1, wherein the V2X antenna system is operable with only DC power and RF signal at an RF feed point.

9. The V2X antenna system of claim 1, wherein the V2X antenna system is configured to provide a wireless path for communication between V2X devices at 5.9 gigahertz (GHz).

10. A vehicular antenna configured for installation to a body wall of a vehicle, the vehicular antenna comprising the V2X antenna system of claim 1 and an antenna configured to be operable with Dedicated Short-Range Communication (DSRC) signals, wherein the V2X antenna system is configured to be operable independent of and without requiring digital communications with an existing V2X system inside the vehicle.

11. The V2X antenna system of claim 1, wherein the coupler is operable for relaying the sensed RF power of the RF signals received from the transmitting device remote from the V2X antenna system via the RF line and relaying the sensed RF power to the microcontroller; and
wherein the microcontroller is operable for controlling at least the first attenuator along the Tx-path to control the power of the RF signals received from the transmitting device via the RF feed line based on the sensed RF power relayed to the microcontroller by the coupler.

12. The V2X antenna system of claim 1, wherein the transmitting device is inside the vehicle.

13. A V2X antenna system for a vehicular antenna configured for installation to a body wall of a vehicle, the V2X antenna system comprising:
RF switches and a front end module (FEM) including a power amplifier (PA);
at least one attenuator including a first attenuator along a transmit path (Tx-path) between the RF switches, wherein the first attenuator is operable for attenuating RF signals received from a transmitting device remote from the V2X antenna system via an RF feed line, wherein the PA is configured to amplify the RF signals attenuated by the first attenuator for re-transmission via the vehicular antenna, thereby enabling the V2X antenna system to compensate for a loss of power of the RF signals received from the transmitting device via the RF feed line;
an adaptive control including a feedback system integrated with the V2X antenna system, the feedback system including a coupler;
wherein the coupler is operable for:
sensing radio frequency (RF) power of the RF signals received from the transmitting device; and
coupling the RF signals received from the transmitting device to the Tx-path;
wherein the adaptive control is operable for:
controlling the RF switches to selectively activate either the Tx-path or a receive path (Rx-path) between the RF switches, wherein the adaptive control is configured to control the RF switches to selectively activate the Tx-path based at least in part on information relayed from the coupler and to selectively activate the Rx-path based at least in part on information relayed from the coupler; and
controlling at least the first attenuator along the Tx-path to control power of the RF signals received from the transmitting device via the RF feed line to a level such that compression of the RF signals when amplified by the PA is reduced or minimized, thereby enabling the V2X antenna system to re-transmit the RF signals received from the transmitting device via the RF feed line through the vehicular antenna without corruption; and
wherein the V2X antenna system is configured to provide a wireless path for communication between V2X devices at 5.9 gigahertz (GHz).

14. The V2X antenna of claim 13, wherein the at least one attenuator includes a second attenuator along the Rx-path and operable for attenuating signals communicated along the Rx-path after amplification by a low noise amplifier.

15. The V2X antenna system of claim 13, wherein the front end module includes a low noise amplifier (LNA); wherein the PA and the LNA are integrated in the front end module; and wherein the front end module includes at least one of the RF switches controllable by the adaptive control.

16. The V2X antenna system of claim 13, wherein:
the adaptive control includes a microcontroller;
wherein the coupler is operable for relaying the information to the microcontroller, and
wherein the microcontroller is operable for:
controlling the RF switches to selectively activate either the Tx-path or the Rx-path between the RF switches based at least in part on the information relayed from the coupler; and
controlling at least the first attenuator along the Tx-path to control power of the RF signals received from the transmitting device via the RF feed line to a level such that compression of the RF signals when amplified by the PA is reduced or minimized.

17. The V2X antenna system of claim 13, wherein the V2X antenna system is operable with only DC power and RF signal at an RF feed point.

18. A vehicular antenna configured for installation to a body wall of a vehicle, the vehicular antenna comprising the integrated V2X antenna system of claim 13 and an antenna configured to be operable with Dedicated Short-Range Communication (DSRC) signals, wherein the V2X antenna system is configured to be operable independent of and without requiring digital communications with an existing V2X system inside the vehicle.

19. The V2X antenna system of claim 16, wherein the coupler is operable for relaying the sensed RF power of the RF signals received from the transmitting device remote from the V2X antenna system via the RF line and relaying the sensed RF power to the microcontroller; and wherein the microcontroller is operable for controlling at least the first attenuator along the Tx-path to control the power of the RF signals received from the transmitting device via the RF feed line based on the sensed RF power relayed to the microcontroller by the coupler.

20. The V2X antenna of claim 13, wherein the FEM includes at least one of the RF switches.

\* \* \* \* \*